March 1, 1938.　　　　G. F. MAIERS　　　　2,109,703
CONVEYING MECHANISM FOR NUT HULLERS
Filed May 27, 1936　　　2 Sheets-Sheet 1

INVENTOR
GEORGE F. MAIERS
BY
ATTORNEYS

March 1, 1938.　　　　G. F. MAIERS　　　　2,109,703
CONVEYING MECHANISM FOR NUT HULLERS
Filed May 27, 1936　　　2 Sheets-Sheet 2

INVENTOR
GEORGE F. MAIERS
BY
Meuer, Anderson + Liddy
ATTORNEYS

Patented Mar. 1, 1938

2,109,703

UNITED STATES PATENT OFFICE 2,109,703

CONVEYING MECHANISM FOR NUT HULLERS

George F. Maiers, Santa Barbara, Calif.

Application May 27, 1936, Serial No. 82,002

6 Claims. (Cl. 198—53)

This invention relates to conveying mechanism for nut hullers and has particular reference to the type of huller disclosed in my co-pending application Serial No. 9,491, filed March 5, 1935, which has eventuated into Patent No. 2,052,718, the present invention being a continuation in part of the invention disclosed in said application.

An object of the invention is to provide positive acting, non-clogging means for continuously elevating unhulled nuts to a hulling machine and for automatically insuring an even flow of nuts to the working parts of said machine.

A further object is to provide conveying mechanism adapted to be radially combined with a huller of the aforementioned type, the effective working parts of which can be driven by a driving element common to the huller and said mechanism.

Modern preparation of nuts, particularly walnuts, causes the hulls to become mushy and of a rotted consistency. These mushy hulls form a slippery coating on all parts which they contact and accumulate upon the elevators of the conveying mechanisms, thereby greatly lessening their capacity and efficiency. It is a fact that in some cases the elevators require the entire time of a man to clean and maintain same in operating condition. It is an essential object of my invention to eliminate these heretofore existing objections and to provide an elevator assembly in which all co-operable parts are self-cleaning, thus providing for continuous operation of said elevators and the huller with which they coact.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction, within the scope of the claims, may be resorted to without departing from the spirit or sacrificing any of the advantages of the invention.

Referring to the drawings.

Figure 1:
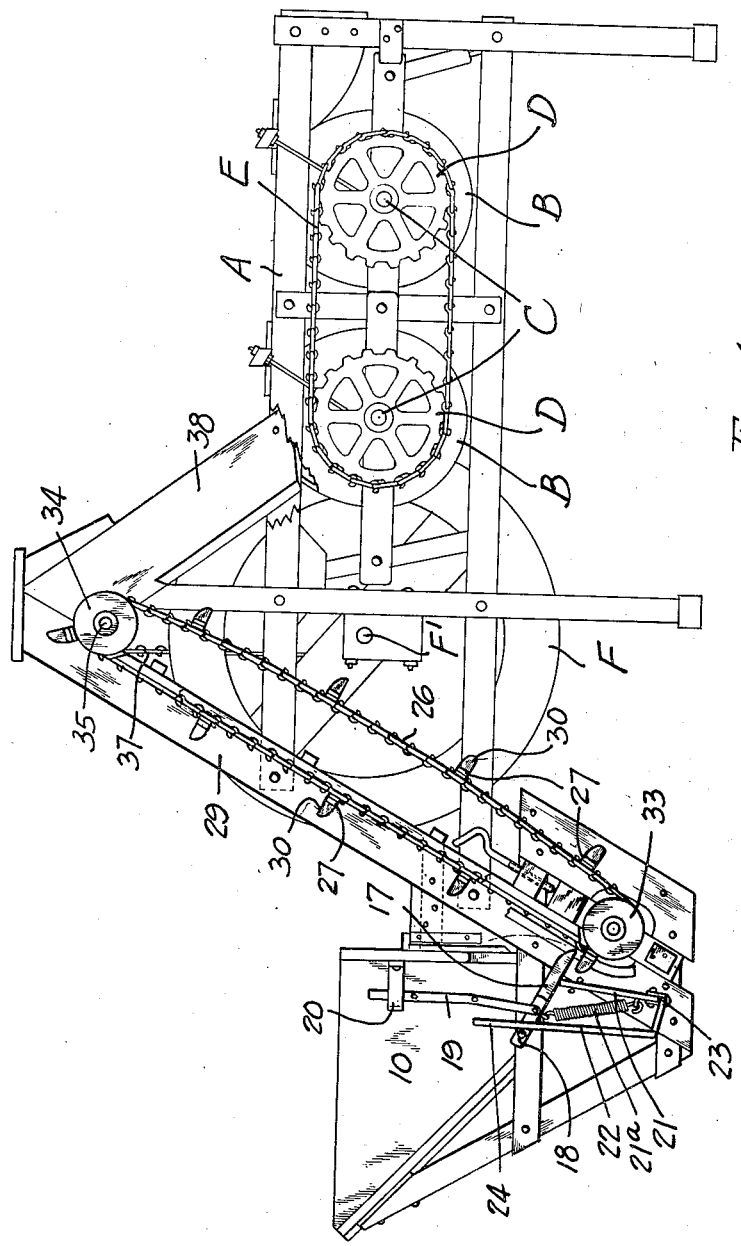
Figure 1 is a view in elevation of the hopper assembly applied to a nut huller, one side of the frame of the assembly being removed.

In carrying the invention into practice, use is made of a huller A, such as the one shown in my co-pending application aforementioned. It is to be understood that the invention, however, is not necessarily limited to use in association with a huller of this specific type. I have combined the two merely to make clear one possible adaptation of the invention to a known form of huller.

Said huller A includes the concaves B, B, the beater shafts C of which are adapted to be operated by the sprockets D and driven chain E. A main driving pulley F is preferably employed, the same as in my co-pending application, for driving one of the beater shafts and for operating the elevator of my improved conveying mechanism.

The elevator assembly comprises a hopper 16, provided with a vertically tiltable bottom 17, hinged at 18 and provided with an agitator 19 which extends vertically into the hopper and is movable in a fixed guide strap 20. A spring 21a serves to normally hold the bottom 17 yieldingly depressed and in engagement with the upper extremity of a vertically movable stop 21 on a bell crank lever 22. Said lever 22 has pivoted connection at 23 with the frame of the hopper assembly 16 and is provided with a long arm 24 adapted to be manually actuated to determine the position of the stop 21 relative to the aforementioned bottom 17. The arm 24 is adapted to co-act with an arcuate series of retaining pins 25 on the hopper frame, whereby the stop 21 can be held in any desired position of vertical adjustment as may be required for intended discharge of nuts from the hopper.

The conveyor 26 of the hopper assembly comprises an endless chain which extends upwardly and forwardly from the hopper. Mounted on the conveyor and suitably spaced apart from each other are nut elevating members, each consisting of a transverse bar 27, the ends of which are formed to travel in guide channels 28 in the conveyor supporting frame 29. In spaced apart relation to each other and formed as integral parts of the bar 27 are lateral fingers 30. The chain 26 is trained over sprockets 31 and 32 at the respective ends of the frame 29, and as shown, each of said sprockets is disposed between alined roller sections 33 and 34 upon the shaft 35 on which the sprocket is mounted. The shaft 35 for the upper sprocket 31 is provided with a sprocket gear 36 adapted to be driven by a drive chain 37 operated from the shaft F'.

The upper end of the conveyor chain 26 is disposed relative to a downwardly inclined chute 38, whereby nuts passing off of the supporting fingers 30 will be delivered to the concave B at the left in Figure 1.

Mounted at the lower end of the frame 29 and beneath the sprocket 31 is a comb 38, having spaced apart lateral teeth 39, adapted to co-act with the finger 30 to clean same of all pulpy accumulations during operation of the conveyor. The roller sections 33 and 34 are formed so that the bars 27 have peripheral contact therewith such as will hold the bars against angular movement whereby the fingers 31 will be uniformly guided through the spaces between the teeth of the comb 38.

On reference to Figure 1 of the drawings, it will be observed that the tiltable bottom 17 of the hopper is disposed in the path of movement of the fingers 30 so that just previous to the discharge of nuts onto the fingers, the bottom will be elevated against the normal action of the spring 21a, thus imparting motion to the agitator 19 to insure intended delivery of the nuts onto said fingers.

Figure 2:
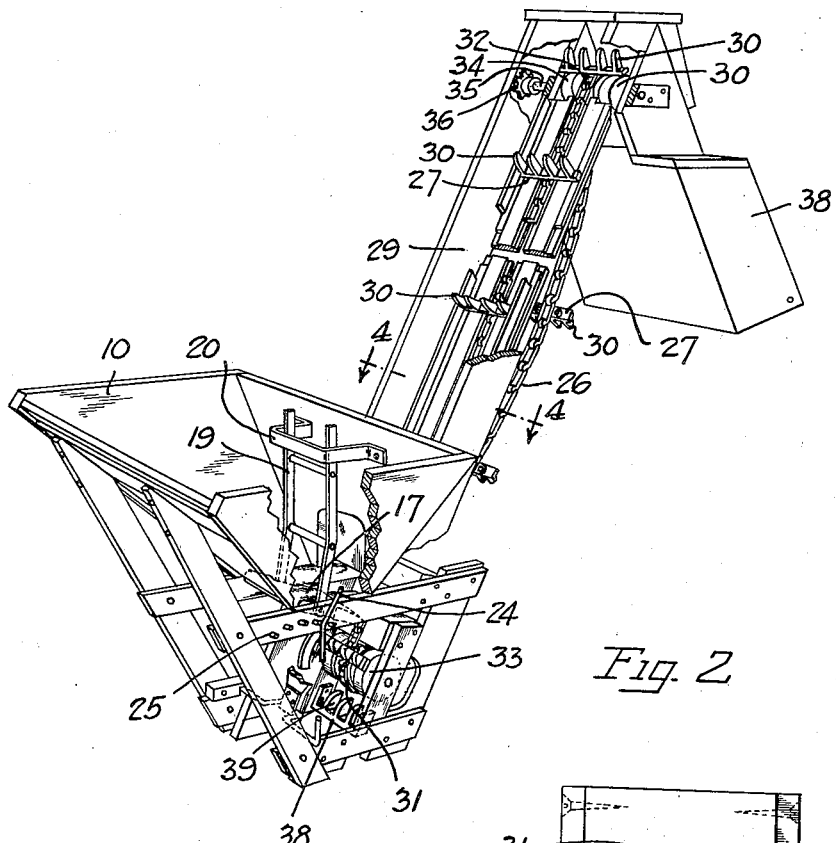
Figure 2 is a perspective view of the conveying mechanism with parts in section.
Figure 4:
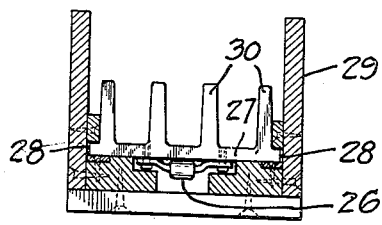
Figure 4 is a transverse section on line 4—4 of Figure 1.
Figure 3:
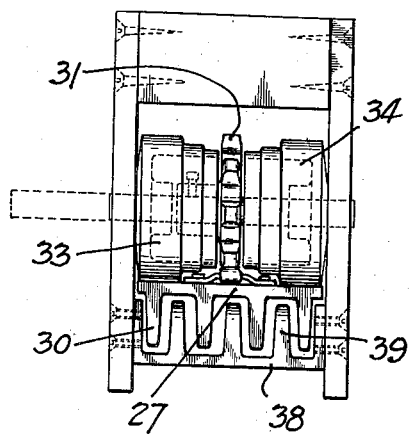
Figure 3 is a view in elevation of the conveyor side of the hopper.
Figure 5:
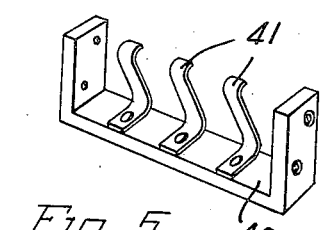
Figure 5 is a perspective view of a modified form of my invention.

The comb 38 shown in Figure 2 is inflexible, whereas the one shown in Figure 5 consists of a rigid mounting 40 having a plurality of teeth 41 of spring metal.

What is claimed is:

1. In a conveyor mechanism for nut hullers, a hopper having a movable bottom from which hulled and/or unhulled nuts can be discharged; a conveyor having means upon which nuts can be deposited when discharged from the hopper; and an agitator extending into the hopper and connected with said bottom to be actuated thereby as same is moved, said means on the conveyor being correlated to the bottom to engage and move same during motion of the conveyor.

2. In a conveyor mechanism for nut hullers, a hopper having a movable bottom from which hulled and/or unhulled nuts can be discharged; means for moving the bottom in one direction; a conveyor having means upon which nuts can be deposited when discharged from the hopper; and an agitator extending into the hopper and connected with said bottom to be actuated thereby as same is moved, said means on the conveyor being correlated to the bottom to engage and move same in an opposite direction during motion of the conveyor.

3. In a conveyor mechanism of the class described, a hopper having a movable bottom; means co-acting with said bottom to urge the latter to open position; adjustable means against which said bottom is urged, for variably predetermining the amount to which the hopper is opened by said bottom; and a conveyor having means for moving said bottom away from the last said means.

4. In mechanism of the class described, a hopper having a movable bottom; means for predetermining movement of the bottom in one direction; means for urging the bottom against said predetermining means; a conveyor having means for moving the bottom away from said predetermining means; and an agitator carried by the bottom and extending into said hopper.

5. In a conveyor mechanism for nut hullers, a nut hopper having a discharge opening; a bottom controlling said opening and movably mounted to vary the size thereof; means for urging the bottom in one direction; a conveyor having means for conveying nuts as discharged from the hopper, and engageable with the bottom to move the latter in the opposite direction during motion of the conveyor; an agitator in the hopper operatively connected to the bottom to be actuated thereby when moved as aforestated; a movable stop disposed in the path of movement of the bottom under the action of said urging means; and means for adjusting and releasably retaining said stop in any one of a plurality of different positions to accordingly vary the extreme position to which the bottom is moved by said urging means whereby to vary the size of said opening and hence vary the feed of the nuts.

6. In a conveyor mechanism for nut hullers, a nut hopper having a discharge opening; a bottom controlling said opening and movably mounted to vary the size thereof; means for urging the bottom in one direction; a conveyor having means for conveying nuts as discharged from the hopper, and engageable with the bottom to move the latter in the opposite direction during motion of the conveyor; an agitator in the hopper operatively connected to the bottom to be actuated thereby when moved as aforestated; a movable stop disposed in the path of movement of the bottom under the action of said urging means; a lever operatively connected to said stop for adjustment of the latter to vary the extreme position to which the bottom is moved by said urging means, and hence the size of the discharge opening; and means with which the lever is adapted to co-act in releasably retaining the stop in any one of a plurality of adjusted positions.

GEORGE F. MAIERS.